United States Patent [19]

Neely, Jr.

[11] 4,334,941
[45] Jun. 15, 1982

[54] MULTIPLE GLAZED UNIT BONDED WITH SILICATE CEMENT

[75] Inventor: James E. Neely, Jr., Butler, Pa.

[73] Assignee: PPG Industries, Inc., Pittsburgh, Pa.

[21] Appl. No.: 286,993

[22] Filed: Jul. 27, 1981

Related U.S. Application Data

[63] Continuation-in-part of Ser. No. 142,492, Apr. 21, 1980, Pat. No. 4,288,252, which is a continuation of Ser. No. 973,479, Dec. 26, 1979, abandoned.

[51] Int. Cl.³ ............................ C09J 1/02; E06B 3/24
[52] U.S. Cl. ................................. 156/107; 106/74; 106/84; 156/99; 428/34; 428/428
[58] Field of Search .................. 428/34, 428, 432; 106/74, 84; 156/99, 107

[56] References Cited

U.S. PATENT DOCUMENTS

| | | | |
|---|---|---|---|
| 3,445,257 | 5/1969 | Hloch et al. | 106/84 |
| 3,454,410 | 7/1969 | Schutt et al. | 106/74 |
| 3,919,023 | 11/1975 | Bowser et al. | 428/34 |
| 3,930,876 | 1/1976 | Nakajima et al. | 106/74 |
| 3,943,231 | 3/1976 | Wasel-Nielen | 106/74 |
| 4,149,348 | 4/1979 | Pyzewski | 428/34 |
| 4,173,668 | 11/1979 | Hentzelt et al. | 428/34 |
| 4,205,104 | 5/1980 | Chenel | 428/34 |

*Primary Examiner*—Mark Bell
*Attorney, Agent, or Firm*—Donna L. Seidel

[57] ABSTRACT

A multiple glazed unit wherein glass sheets are bonded together and held in spaced relationship by means of an alkali silicate based cement composition is disclosed.

6 Claims, 3 Drawing Figures

MULTIPLE GLAZED UNIT BONDED WITH SILICATE CEMENT

CROSS REFERENCE TO RELATED APPLICATIONS

This application is a continuation-in-part of copending U.S. application Ser. No. 142,492 filed Apr. 21, 1980, now U.S. Pat. No. 4,288,252 which in turn is a continuation of U.S. application Ser. No. 973,479 filed Dec. 26, 1979, now abandoned.

THE PRIOR ART

U.S. Pat. No. 3,445,257 to Hloch et al, describes condensed aluminum phosphates used as hardeners for water glass cements. The condensed aluminum phosphates are prepared by subjecting aluminum orthophosphates to a stepwise thermal treatment. The cements are prepared from potash or soda water glasses by mixing 90 to 100 parts filler with 4 parts hardener, and then adding 25 to 30 parts of water glass. A typical cement has a pot life of 30 minutes, and then cures within 24 hours to form a mass that is resistant to acids and water.

U.S. Pat. No. 3,930,876 to Nakajima et al discloses an improved silica-phosphate type inorganic coating composition comprising a water-soluble silicate and an inorganic phosphate pretreated with such silicate. The pretreatment is accomplished by mixing the phosphate in powder form with an aqueous solution of the silicate in a mechanical mill. Filler and/or pigment in amounts of 60 percent by weight or less based on the weight of the pretreated phosphate may be added during or after the pretreatment of the phosphate. About 60 to 100 parts by weight of the pretreated phosphate and 100 parts by weight of silicate are then mixed together to form a uniform composition generally having a water content of ¼ to 2 parts by weight water per part of total solids.

SUMMARY OF THE INVENTION

Figure 1:
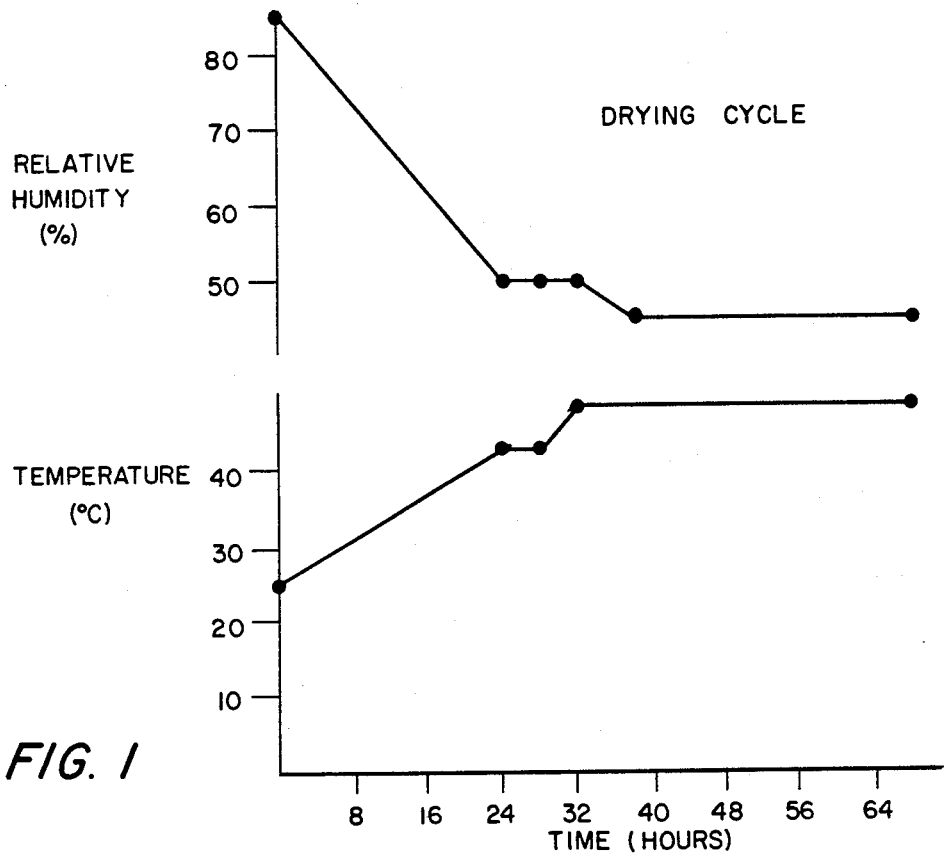
FIG. 1 illustrates the drying cycle and
FIG. 2 the firing cycles described in the Examples of the present invention.

The present invention provides a method for bonding glass plates in a multiple glazed unit utilizing silicate cements which can be cured at relatively low temperatures using inorganic hardeners. The method of the present invention involves milling or blending a mixture of alkali silicate, inorganic curing agent and optional filler. The water content of the mixture is adjusted to produce a cementitious material of suitable viscosity. The aqueous composition of the present invention is applied between two glass plates about their periphery, dried, and cured at relatively low temperatures. The water stable cured silicate cement acts as spacer as well as bonding agent in the multiple glazed unit.

DESCRIPTION OF THE PREFERRED EMBODIMENTS

Aqueous alkali metal or ammonium silicate compositions containing inorganic curing agents are preferably prepared according to the method disclosed in U.S. Pat. No. 4,288,252 filed Apr. 21, 1980, the disclosure of which is incorporated herein by reference. A mixture of inorganic curing agent and filler is blended in any typical mechanical mixer such as a planetary mixer. The inorganic curing agent may comprise any of the variety of phosphate, borate, aluminate or zincate curing agents which are useful for hardening silicate compositions, and preferably comprises the B-form of aluminum trimetaphosphate as disclosed in U.S. Pat. No. 4,216,190, which disclosure is incorporated herein by reference. A preferred method for making the B-form of aluminum trimetaphosphate is disclosed in U.S. application Ser. No. 210,480 filed Nov. 26, 1980, the disclosure of which is incorporated herein by reference.

Preferably, the hardener is mixed with an alkali silicate which is a mixture of sodium silicate and potassium silicate. Preferred sodium silicates have mole ratios of $SiO_2/Na_2O$ between about 3.0 and 4.0 and are readily available as aqueous solutions from suppliers such as Diamond Shamrock Corporation of Cleveland, Ohio. Preferred potassium silicates have mole ratios of $SiO_2/K_2O$ between about 3.1 and 4.0 and are commercially available as aqueous solutions under the tradename KASIL from Philadelphia Quartz Corporation of Valley Forge, Pa. Potassium silicates may also be formulated in solid form by mixing silica and potassium carbonate in the desired ration, melting and cooling to form a glass, and then sending the glass through hammer, roller, ball and/or vibratory mills to reduce the glass to a powder.

Cement compositions according to the present invention may be formulated by mixing sodium silicate solution with potassium silicate powder. While the mixed alkali silicate solution is being stirred, the inorganic phosphate hardener is added. The phosphate may be added as an aqueous slurry or it may be mixed with any dry filler powders that are being incorporated into the formulation. Preferably, mixing is carried out in a vacuum in order to remove entrained air. The composition is continuously mixed under vacuum until the viscosity increases to at least about 1,000,000 centipoises. The viscous cement is then loaded into plastic tubes which are used in conjunction with pneumatic guns for applying the cement between two sheets of glass. A preferred process for formulating cements in accordance with the present invention is to mix all the dry powder constituents in a roller mill and then to add the sodium silicate solution. The composition is then mixed in a vacuum mixer until the viscosity increases to the desired level, and the cement is loaded into plastic tubes for application by means of a pneumatic gun.

The cement composition is preferably applied between two glass sheets in a horizontal orientation. The top glass sheet is spaced from the bottom sheet and may be held in place either by mechanical spacers or suction cups. In a preferred embodiment, styrofoam blocks approximately ½ inch square and having the thickness of the desired airspace in the multiple glazed window unit are placed at the four corners between the two glass sheets. The cement composition is then applied in a continuous bead recessed approximately ¼ inch about the periphery between the two glass sheets. Following application of the cement, the units are transferred to a drying chamber. The initial conditions in the drying chamber are typically room temperature of about 25° C. and high relative humidity, typically 65 percent or higher. Preferably, vacuum lines are inserted inside the double glazed unit during this drying treatment to keep the relative humidity the same on the inside as the outside of the unit. In the drying chamber, the temperature is raised and the relative humidity decreases to final conditions of about 45° to 70° C. and relative humidity below about 40 percent, preferably about 20 percent.

Following this drying cycle, the double glazed unit is subjected to a firing treatment to cure the cement. Initially, the unit is at a temperature of about 45° C. and a low relative humidity, preferably less than about 10 percent. The unit is then heated from 45° C. to a final temperature between about 160° and 210° C. after which the unit is cooled to the initial temperature of about 45° C. After curing of the cement, the unit is preferably purged with dry air for at least about 2 hours. Following the dry air purge, the unit is sealed.

The present invention will be further understood from the descriptions of specific examples which follow.

EXAMPLE I

A cement composition is formulated by mixing together 37.4 grams of B-form aluminum trimetaphosphate, 41.4 milliliters of water, 221.6 grams of sodium silicate solution, 144 grams of potassium silicate powder, 45 grams of talc and 135 grams of fused silica powder. The aluminum trimetaphosphate is prepared by blending stoichiometric quantities of basic ammonium phosphate with aluminum hydroxide and heating to 600° C. for 2 hours. The sodium silicate solution is prepared by diluting Diamond Shamrock Grade 34 sodium silicate with 90 milliliters of water. The potassium silicate powder is prepared by mixing silica and potassium carbonate in a weight ratio of 1.36:1. The mixture is melted, cast and cooled to form a glass which is then sent through hammer, roller, ball and/or vibratory mills to reduce the glass to a powder. The talc is available as MP 40-27 from Pfizer Minerals, Pigments and Metals Division, New York, N.Y. The composition is mixed for about 20 minutes under vacuum, and subsequently applied by pneumatic gun between two glass sheets in the form of a bead which is recessed about ¼ inch from the edges of the sheets. The unit is subjected to a drying cycle wherein the temperature is raised from 25° C. to 48° C. while the relative humidity decreases from 85 to 45 percent over a period of 66 hours. The cement composition is then cured by subjecting the unit to a firing treatment wherein the temperature is increased from 45° C. to 150° C. over a period of 30 hours and is then decreased to 50° C. over a period of 15 hours. The drying cycle is illustrated in FIG. 1, and the firing treatment in FIG. 2.

EXAMPLE II

A cement composition is formulated by mixing together a slurry of 35 grams aluminum trimetaphosphate in 35 milliliters of water; a solution of alkali silicate comprising 215.4 grams of Diamond Shamrock Grade 34 sodium silicate solution, 360.8 grams of KASIL 6 potassium silicate solution from Philadelphia Quartz Corporation and 35 milliliters of water; and 200 grams of talc. The composition is mixed, applied between glass sheets and subjected to the drying and firing schedules described in Example I.

EXAMPLE III

Figure 2:
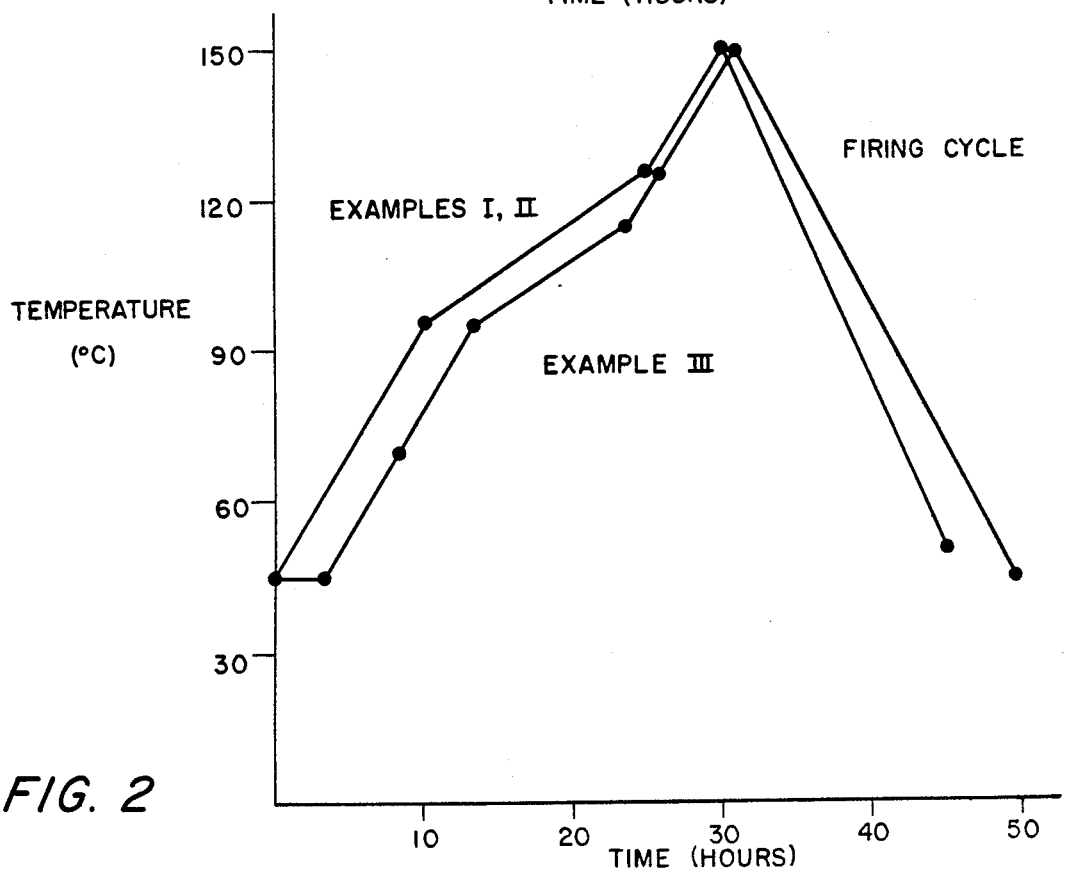
Figure 3:
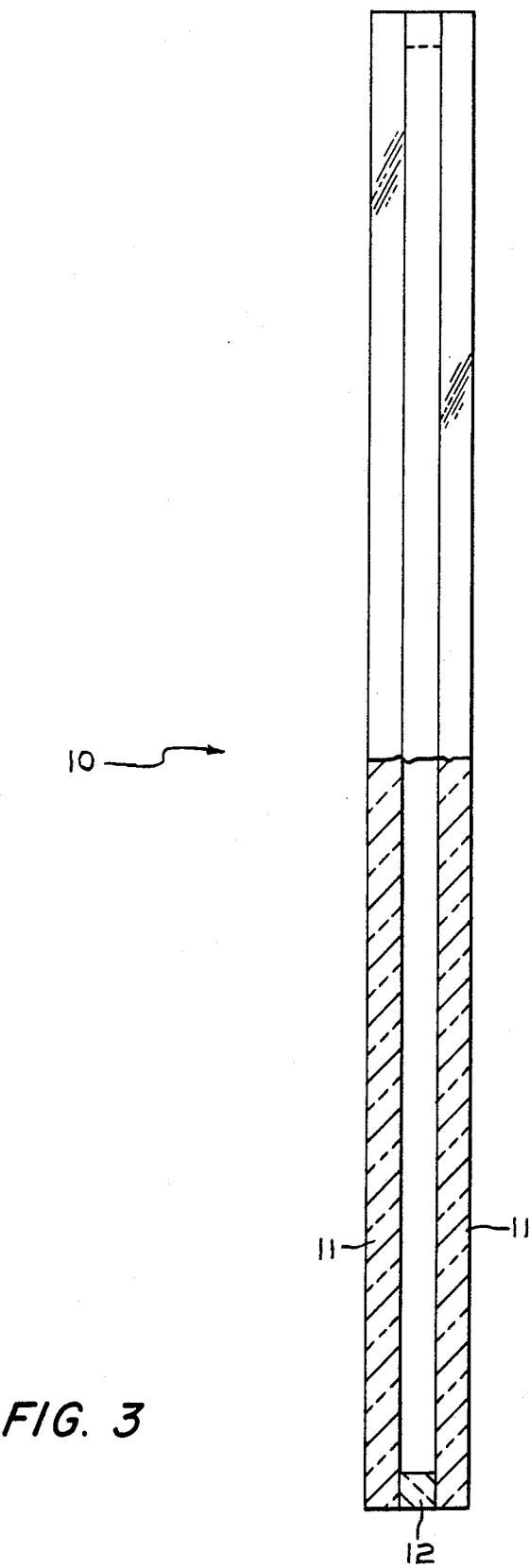
FIG. 3 illustrates a multiple glazed unit 10 comprising two sheets of glass 11 bonded together by silicate cement 12 in accordance with the present invention.

A cement composition is formulated by mixing 206.4 grams of Diamond Shamrock Grade 34 sodium silicate solution and 542.1 grams of KASIL 1 potassium silicate solution from Philadelphia Quartz Corporation with 10 milliliters of water. To the mixed alkali silicate solution is added a slurry of 35 grams of B-form aluminum trimetaphosphate in 35 milliliters of water. Finally, 213 grams of talc is added to the composition, which is then mixed in a vacuum for about 2 hours. The cement composition is applied and dried as in the previous examples; however, the firing treatment is slightly different as illustrated in FIG. 2.

All of the above examples illustrate the production of multiple glazed units with mixed alkali silicate cement compositions. Various modifications such as different compositions and other drying and firing cycles may be employed, and are included within the scope of the present invention, which is defined by the following claims.

I claim:

1. A method for bonding two sheets of glass in spaced relationship comprising the steps of:
    a. mixing sodium silicate, potassium silicate and B-form of aluminum trimetaphosphate with water to from a cement composition;
    b. applying said cement composition between two spaced glass sheets to be bonded;
    c. exposing said cement composition to sufficient temperature for sufficient time to dry and cure the cement composition, thereby bonding said glass sheets in spaced relationship.

2. The method according to claim 1, wherein the cement composition further comprises a filler.

3. The method according to claim 2, wherein said filler is selected from the group consisting of talc, silica and mixtures thereof.

4. An article of manufacture which comprises:
    a. at least two glass sheets in spaced relationship;
    b. a cement composition consisting essentially of sodium silicate, potassium silicate and B-form of aluminum trimetaphosphate, wherein said glass sheets are bonded together and held in spaced relationship by said cement composition.

5. An article according to claim 4, wherein said cement composition further comprises a filler.

6. An article according to claim 5, wherein said filler is selected from the group consisting of talc, silica and mixtures thereof.

* * * * *